US011559824B2

United States Patent
Pankoke (10) Patent No.: US 11,559,824 B2
(45) Date of Patent: Jan. 24, 2023

(54) METHOD FOR PRODUCING A STRUCTURE ON A SURFACE

(71) Applicant: Hymmen GmbH Maschinen- und Anlagenbau, Bielefeld (DE)

(72) Inventor: René Pankoke, Bielefeld (DE)

(73) Assignee: Hymmen GmbH Maschinen-und Anlagenbau, Bielefeld (DE)

( * ) Notice: Subject to any disclaimer, the term of this patent is extended or adjusted under 35 U.S.C. 154(b) by 0 days.

(21) Appl. No.: 16/865,355

(22) Filed: May 3, 2020

(65) Prior Publication Data
US 2020/0346246 A1    Nov. 5, 2020

(30) Foreign Application Priority Data
May 3, 2019  (DE) ..................... 10 2019 206 431.0

(51) Int. Cl.
*B05D 1/02*    (2006.01)
*B05B 1/02*    (2006.01)
(Continued)

(52) U.S. Cl.
CPC .................. *B05D 1/02* (2013.01); *B05B 1/02* (2013.01); *B05D 3/007* (2013.01); *B24B 7/19* (2013.01);
(Continued)

(58) Field of Classification Search
CPC ................................. B05D 1/02; B05D 3/007
See application file for complete search history.

(56) References Cited

U.S. PATENT DOCUMENTS

| 692,701 A | 2/1902 | Burner |
| 3,308,227 A | 3/1967 | Power et al. |

(Continued)

FOREIGN PATENT DOCUMENTS

| AT | 387621 | 2/1989 |
| CA | 2568440 | 12/2005 |

(Continued)

OTHER PUBLICATIONS

Final Official Action dated Feb. 18, 2021 From the US Patent and Trademark Office Re. U.S. Appl. No. 16/494,307. (21 Pages).
(Continued)

*Primary Examiner* — Nathan H Empie (57) ABSTRACT

A method for manufacturing a structure on a surface of a workpiece (1) is disclosed, the method having the following steps:
  applying a liquid base layer (2) onto the surface of the workpiece (1);
  spraying on at least one droplet (3) into the not yet congealed base layer (2), wherein the at least one droplet (3) at least partially, preferably completely, penetrates into the base layer (2);
  fixing the base layer (2); and
  at least partially removing the at least one droplet (3).
Further, a second method having the following steps is disclosed:
  spraying on at least one droplet (3) onto the surface of the workpiece (1);
  applying a liquid base layer (2) onto the surface of the workpiece (1), wherein the base layer (2) flows around the at least one droplet (3) and preferably at least partially covers the at least one droplet (3);
  fixing the base layer (2);
  at least partially removing the at least one droplet (3).
Finally, a device for performing the methods is disclosed.

32 Claims, 4 Drawing Sheets

(51) Int. Cl.
  *B05D 3/00* (2006.01)
  *B24B 7/19* (2006.01)
  *B24B 21/04* (2006.01)
  *B24B 53/00* (2006.01)
  *B41M 5/00* (2006.01)
  *B44C 3/00* (2006.01)
  *B29C 59/02* (2006.01)
  *B29C 59/16* (2006.01)
  *B24B 29/00* (2006.01)

(52) U.S. Cl.
  CPC ............ *B24B 21/04* (2013.01); *B24B 53/003* (2013.01); *B29C 59/02* (2013.01); *B29C 59/16* (2013.01); *B41M 5/0041* (2013.01); *B44C 3/005* (2013.01); *B24B 29/005* (2013.01); *B29C 2059/027* (2013.01)

(56) References Cited

U.S. PATENT DOCUMENTS

| | | | |
|---|---|---|---|
| 3,580,768 A * | 5/1971 | Kulka | B44C 3/025 427/196 |
| 3,676,963 A | 7/1972 | Rice et al. | |
| 4,439,480 A | 3/1984 | Sachs et al. | |
| 4,513,299 A | 4/1985 | Lee et al. | |
| 4,557,778 A | 12/1985 | Held | |
| 4,668,765 A | 5/1987 | Drawert et al. | |
| 5,178,928 A | 1/1993 | Goto et al. | |
| 5,306,783 A | 4/1994 | Kirchgaessner et al. | |
| 5,358,737 A | 10/1994 | Muees et al. | |
| 5,779,779 A | 7/1998 | Jolly | |
| 6,120,845 A | 9/2000 | Pease | |
| 6,150,009 A | 11/2000 | Stecker | |
| 6,193,361 B1 | 2/2001 | Wen | |
| 6,354,686 B1 | 3/2002 | Tanaka et al. | |
| 6,375,777 B1 | 4/2002 | Sjolin et al. | |
| 6,589,357 B1 | 7/2003 | Wandres | |
| 6,621,087 B1 | 9/2003 | Bisges et al. | |
| 6,830,305 B1 | 12/2004 | Takizawa | |
| 6,927,014 B1 | 8/2005 | Figov | |
| 7,001,016 B2 | 2/2006 | Baxter et al. | |
| 9,266,382 B2 † | 2/2016 | Schacht | |
| 11,141,759 B2 | 10/2021 | Pankoke | |
| 2002/0018085 A1 | 2/2002 | Asauchi et al. | |
| 2002/0061389 A1 | 5/2002 | Brooker et al. | |
| 2003/0011651 A1 | 1/2003 | Rupprecht et al. | |
| 2003/0152715 A1 | 8/2003 | Beck et al. | |
| 2003/0167717 A1 | 9/2003 | Garcia | |
| 2004/0028830 A1 | 2/2004 | Bauer | |
| 2004/0048171 A1 | 3/2004 | Grabher et al. | |
| 2004/0086678 A1 | 5/2004 | Chen et al. | |
| 2004/0241416 A1 | 12/2004 | Tian et al. | |
| 2005/0103182 A1 | 5/2005 | Spurgeon | |
| 2005/0255249 A1 | 11/2005 | Schlatterbeck et al. | |
| 2006/0075917 A1 | 4/2006 | Edwards | |
| 2006/0130421 A1 | 6/2006 | Nollet | |
| 2006/0163371 A1 | 7/2006 | Veil | |
| 2006/0209108 A1 | 9/2006 | Hamazaki et al. | |
| 2006/0238554 A1 | 10/2006 | Hosono et al. | |
| 2007/0160790 A1 | 7/2007 | Kaneko et al. | |
| 2007/0235410 A1* | 10/2007 | Wong | B44C 1/22 216/41 |
| 2007/0283648 A1 | 12/2007 | Chen | |
| 2007/0296790 A1 | 12/2007 | Nakazawa et al. | |
| 2008/0074482 A1 | 3/2008 | Makuta et al. | |
| 2008/0081116 A1 | 4/2008 | Makuta et al. | |
| 2008/0084466 A1 | 4/2008 | Makuta et al. | |
| 2008/0176039 A1 | 7/2008 | Chen et al. | |
| 2008/0187680 A1 | 8/2008 | Kawakami et al. | |
| 2008/0241481 A1 | 10/2008 | Tokumoto et al. | |
| 2008/0280028 A1 | 11/2008 | Albrecht et al. | |
| 2009/0225143 A1 | 9/2009 | Fukui | |
| 2009/0246365 A1 | 10/2009 | Ito et al. | |
| 2010/0092688 A1 | 4/2010 | Serbutoviez et al. | |
| 2011/0067731 A1 | 3/2011 | Satoh et al. | |
| 2011/0157272 A1 | 6/2011 | Ikehata et al. | |
| 2012/0015107 A1* | 1/2012 | Schacht | B44C 5/043 427/261 |
| 2013/0065024 A1 | 3/2013 | Aruga et al. | |
| 2013/0101796 A1 | 4/2013 | Arzt et al. | |
| 2013/0286088 A1 | 10/2013 | Ryberg et al. | |
| 2013/0286095 A1 | 10/2013 | Wada et al. | |
| 2013/0341532 A1 | 12/2013 | Lee et al. | |
| 2014/0017452 A1 | 1/2014 | Pervan et al. | |
| 2014/0343687 A1 | 11/2014 | Jennissen | |
| 2016/0009932 A1 | 1/2016 | Jang et al. | |
| 2016/0114619 A1 | 4/2016 | Schacht et al. | |
| 2016/0205965 A1* | 7/2016 | Elejalde | A23G 4/062 |
| 2016/0238774 A1* | 8/2016 | Koike | G02B 6/005 |
| 2016/0297223 A1 | 10/2016 | Langenscheidt et al. | |
| 2016/0332479 A1 | 11/2016 | Clement | |
| 2017/0081522 A1 | 3/2017 | Adam et al. | |
| 2017/0333936 A1 | 11/2017 | Gibson et al. | |
| 2018/0056671 A1 | 3/2018 | Boniface | |
| 2020/0016627 A1 | 1/2020 | Pankoke | |
| 2020/0016629 A1 | 1/2020 | Pankoke | |
| 2020/0023662 A1 | 1/2020 | Pankoke | |
| 2020/0040799 A1 | 2/2020 | Won | |
| 2020/0346395 A1 | 11/2020 | Pankoke | |
| 2020/0346484 A1 | 11/2020 | Pankoke | |
| 2020/0368777 A1 | 11/2020 | Pankoke | |
| 2021/0268542 A1 | 9/2021 | Pankoke | |
| 2021/0394232 A1 | 12/2021 | Pankoke | |

FOREIGN PATENT DOCUMENTS

| | | |
|---|---|---|
| CA | 2406991 | 1/2020 |
| CN | 1166386 | 12/1997 |
| CN | 1572380 | 2/2005 |
| CN | 1653390 | 8/2005 |
| CN | 101116987 | 2/2008 |
| CN | 101301821 | 11/2008 |
| CN | 101314981 | 12/2008 |
| CN | 101342844 | 1/2009 |
| CN | 102089088 | 6/2011 |
| CN | 102256806 | 11/2011 |
| CN | 102834188 | 12/2012 |
| CN | 103035983 | 4/2013 |
| CN | 103192656 | 7/2013 |
| CN | 103209770 | 7/2013 |
| CN | 103737464 | 4/2014 |
| CN | 104039368 | 9/2014 |
| CN | 105377521 | 3/2016 |
| CN | 105835589 | 8/2016 |
| DE | 3107798 | 9/1982 |
| DE | 3331391 | 3/1985 |
| DE | 69119743 | 1/1997 |
| DE | 19532819 | 3/1997 |
| DE | 19810455 | 9/1999 |
| DE | 69709984 | 9/2002 |
| DE | 60009141 | 10/2004 |
| DE | 60007560 | 12/2004 |
| DE | 69732819 | 4/2006 |
| DE | 10316695 | 12/2006 |
| DE | 102006003798 | 7/2007 |
| DE | 10 006042063 | 3/2008 |
| DE | 102007019871 | 10/2008 |
| DE | 102007055053 | 5/2009 |
| DE | 102008024149 | 12/2009 |
| DE | 102009043812 | 3/2011 |
| DE | 102009044802 | 12/2011 |
| DE | 102009004482 | 3/2012 |
| DE | 102010052518 | 5/2012 |
| DE | 102015107259 | 11/2016 |
| DE | 102015110236 | 12/2016 |
| DE | 102015110268 | 12/2016 |
| DE | 102016120878 | 5/2017 |
| DE | 102009044802 B4 | 11/2017 |
| DE | 102017113035 | 12/2018 |
| DE | 4421559 | 5/2020 |
| EP | 0019221 | 11/1980 |
| EP | 0197267 | 10/1986 |
| EP | 0210620 | 2/1987 |

(56) References Cited

FOREIGN PATENT DOCUMENTS

| | | |
|---|---|---|
| EP | 0553421 | 8/1993 |
| EP | 0372097 | 6/1996 |
| EP | 0719647 | 7/1996 |
| EP | 0810039 | 12/1997 |
| EP | 0827838 | 3/1998 |
| EP | 1101542 | 5/2001 |
| EP | 1294578 | 3/2003 |
| EP | 1384595 | 1/2004 |
| EP | 1449667 | 8/2004 |
| EP | 1454763 | 9/2004 |
| EP | 1482085 | 12/2004 |
| EP | 1652686 | 5/2006 |
| EP | 1685974 | 8/2006 |
| EP | 1728639 | 12/2006 |
| EP | 1872959 | 1/2008 |
| EP | 1902849 A1 | 3/2008 |
| EP | 1911594 | 4/2008 |
| EP | 1952998 | 8/2008 |
| EP | 2042335 | 4/2009 |
| EP | 2050514 | 4/2009 |
| EP | 1872959 B1 | 7/2009 |
| EP | 1290290 | 1/2010 |
| EP | 2174772 | 4/2010 |
| EP | 2181860 | 5/2010 |
| EP | 2251205 | 11/2010 |
| EP | 2280130 | 2/2011 |
| EP | 2301762 | 3/2011 |
| EP | 2308682 | 4/2011 |
| EP | 2418019 | 2/2012 |
| EP | 2174772 B1 | 5/2012 |
| EP | 1902849 B1 | 8/2012 |
| EP | 2786807 | 10/2014 |
| EP | 2857221 | 4/2015 |
| EP | 2873535 | 5/2015 |
| EP | 2873536 | 5/2015 |
| EP | 2883712 | 6/2015 |
| EP | 1290290 B2 | 12/2015 |
| EP | 3090882 | 11/2016 |
| EP | 3109056 | 12/2016 |
| EP | 2555878 | 12/2017 |
| EP | 3109056 | 2/2018 |
| EP | 3415316 | 12/2018 |
| EP | 3415317 | 12/2018 |
| EP | 3415318 | 12/2018 |
| EP | 3415319 | 12/2018 |
| EP | 3466677 | 4/2019 |
| EP | 2313281 | 9/2020 |
| EP | 3875248 | 9/2021 |
| EP | 3875248 A1 † | 9/2021 |
| ES | 370796 | 1/1972 |
| ES | 1018178 | 1/1992 |
| ES | 2340456 | 6/2010 |
| ES | 2349527 | 1/2011 |
| ES | 2586981 | 10/2016 |
| FR | PR 2936965 | 4/2010 |
| FR | 2946959 | 12/2010 |
| GB | 1405643 | 9/1975 |
| JP | 59-169575 | 9/1984 |
| JP | 06-270372 | 9/1994 |
| JP | 09323434 | 12/1997 |
| JP | 2003-285000 | 10/2003 |
| JP | 2004-042548 | 2/2004 |
| JP | 2004-134760 | 4/2004 |
| JP | 2008-093910 | 4/2008 |
| JP | 2008-246993 | 10/2008 |
| JP | 2010-069684 | 4/2010 |
| JP | 2011-173091 | 9/2011 |
| JP | 2017-200740 | 11/2017 |
| KR | 1020030083066 | 10/2003 |
| KR | 1020060004828 | 1/2006 |
| KR | 1020090066585 | 6/2009 |
| KR | 2010-0120434 | 11/2010 |
| RU | 2005132339 | 4/2007 |
| WO | WO 90/15673 | 12/1990 |
| WO | WO 98/08687 | 3/1998 |
| WO | WO 99/12736 | 3/1999 |
| WO | WO 99/67227 | 12/1999 |
| WO | WO 00/30856 | 6/2000 |
| WO | WO 01/47718 | 7/2001 |
| WO | WO 02/08346 | 1/2002 |
| WO | WO 02/33740 | 4/2002 |
| WO | WO 02/068189 | 9/2002 |
| WO | WO 2003/099456 | 12/2003 |
| WO | WO 2005/116361 | 12/2005 |
| WO | WO 2006/037644 | 4/2006 |
| WO | WO 2006/080362 | 8/2006 |
| WO | WO 2007/026172 | 3/2007 |
| WO | WO 2007/088245 | 8/2007 |
| WO | WO 2008/089021 | 7/2008 |
| WO | WO 2008/110883 | 9/2008 |
| WO | WO 2008/132126 | 11/2008 |
| WO | WO 2010/070485 | 6/2010 |
| WO | WO 2010/079014 | 7/2010 |
| WO | WO 2011/064075 | 6/2011 |
| WO | WO 2011/126148 | 10/2011 |
| WO | WO 2014/184418 | 11/2014 |
| WO | WO 2015/078449 | 6/2015 |
| WO | WO 2016/014617 | 1/2016 |
| WO | WO 2016/142510 | 9/2016 |
| WO | WO 2017/204361 | 11/2017 |
| WO | WO 2018/069874 | 4/2018 |
| WO | 2020039361 A1 † | 2/2020 |
| WO | WO 2020/039361 | 2/2020 |

OTHER PUBLICATIONS

Third Party Submission under 37 CFR 1.290 filed on Jan. 29, 2021 From the US Patent and Trademark Office Re. U.S. Appl. No. 16/494,308.(2 Pages).

Third Party Submission under 37 CFR 1.290 filed on Jan. 29, 2021 From the US Patent and Trademark Office Re. U.S. Appl. No. 16/494,309.(2 Pages).

Third-Party Submission Under 37 CFR 1.290 filed Jan. 29, 2021 From the US Patent and Trademark Office Re. U.S. Appl. No. 16/494,310. (2 Pages).

USPTO Communication dated Feb. 11, 2021 Re Third-Party Submission From the US Patent and Trademark Office Re. U.S. Appl. No. 16/494,309.(2 Pages).

USPTO Communication dated Feb. 3, 2021 Re Third-Party Submission From the US Patent and Trademark Office Re. U.S. Appl. No. 16/494,308.(2 Pages).

USPTO Communication dated Feb. 3, 2021 Re Third-Party Submission From the US Patent and Trademark Office Re. U.S. Appl. No. 16/494,310.(2 Pages).

Wikipedia "Inkjet Printing", Wikipedia, p. 1-15, Last Edited Aug. 31, 2020.

Wikipedia "Ultraviolet", Wikipedia, the Free Encyclopedia, 29 P., Jun. 12, 2017.

Wikipedia "UV Curing", Wikipedia the Free Encyclopedia, 3 P. Apr. 12, 2017.

Official Action dated Aug. 27, 2020 from the US Patent and Trademark Office Re. U.S. Appl. No. 16/494,307. (26 pages).

Ezzeldin et al. "Improving the Performance of an Inkjet Printhead Using Model Predictive Control," Preprints of the 18th IFAC World Congress, Sep. 2, 2011: 11544-11549.

Emmler "Neue Entwicklungen bei der Industriellen Beschichtung von Holz und Holzwerkstoffen fuer Innenanwendungen", Technische Universitaet Dresden, Fakultaet Maschinenwese, Institut fuer Holz- und Papiertechnik, Tagungsband des 14. Holztechnologischen Kolloquiums, Dresden, Germany, Apr. 8-9, 2010, Schriftenreihe Holz- und Papiertechnik, 5: 120-125, Apr. 8, 2010.

Real Academia Espanola "Barniz", Diccionario de la Lengua Espanola— Edicion del Tricentanario, Real Academia Espanola, Definition, 3 P., Oct. 11, 2014.

Von Aufschnaiter "Industrial Ceramic Tile Manufacturing", Durst Phototechnik, Slideshow, p. 1-18, Nov. 3, 2014.

Beuth "Paints and Varnishes—Determination of Gloss Value at 20°, 60° and 85° (ISO 2813:2014), German Version EN ISO 2813:2014", Beuth Publishing DIN, 2 P., Feb. 2015.

(56) References Cited

OTHER PUBLICATIONS

Restriction Official Action dated Apr. 26, 2021 from the US Patent and Trademark Office Re. U.S. Appl. No. 16/494,308. (6 pages).
Final Official Action dated Feb. 7, 2022 from US Patent and Trademark Office Re. U.S. Appl. No. 16/494,308. (17 pages).
Wijshoff "The Dynamics of the Piezo Inkjet Printhead Operation", Physics Report, 491(4-5): 77-177, Available Online Mar. 31, 2010.
Official Action dated Dec. 8, 2021 from US Patent and Trademark Office Re. U.S. Appl. No. 16/494,309. (62 pages).
Third Party IDS Submission under 37 CFR 1.290 filed on Nov. 4, 2021 From the US Patent and Trademark Office Re. U.S. Appl. No. 16/865,356.(3 Pages).
Third Party Submission under 37 CFR 1.290 filed on Nov. 28, 2021 From the US Patent and Trademark Office Re. U.S. Appl. No. 16/865,358.(3 Pages).
USPTO Communication dated Dec. 1, 2021 Re Third-Party Submission From the US Patent and Trademark Office Re. U.S. Appl. No. 16/865,358.(2 Pages).
USPTO Communication dated Nov. 10, 2021 Re Third-Party Submission From the US Patent and Trademark Office Re. U.S. Appl. No. 16/865,356.(2 Pages).
Official Action with Third-Party Submission dated Sep. 10, 2021 From the US Patent and Trademark Office Re. U.S. Appl. No. 16/494,308. (50 Pages).
Notice of Allowance dated Apr. 20, 2022 from US Patent and Trademark Office Re. U.S. Appl. No. 16/494,309. (16 pages).
Notice of Allowance dated Apr. 21, 2022 from US Patent and Trademark Office Re. U.S. Appl. No. 16/494,308. (16 pages).
Restriction Official Action dated May 27, 2022 from the U.S. Patent and Trademark Office Re. U.S. Appl. No. 16/494,310. (10 pages).
"Barberan Industrial Solutions Since 1929", Barberan, English Transaltion. 10 P., Sep. 25, 2019.
"Darstellung Hilfslinie [Appearance Guideline]", 1 P.
"DIBUJO TEC 1 and TEC 2", 1P.
"Widerspruchsbegruendung and it's machine-translation in English".
"Yupo Corporation, product information", retrieved from the internet on Feb. 25, 2022.
Notice of Allowance dated Aug. 24, 2022 from U.S. Patent and Trademark Office Re. U.S. Appl. No. 16/494,308. (26 pages).
Restriction Official Action dated Jul. 28, 2022 from U.S. Patent and Trademark Office Re. U.S. Appl. No. 16/865,356. (5 pages).
Restriction Official Action dated Jun. 29, 2022 from U.S. Patent and Trademark Office Re. U.S. Appl. No. 17/322,966. (7 pages).
Third Party IDS Submission under 37 CFR 1.290 filed on Aug. 3, 2022 From the U.S. Patent and Trademark Office Re. U.S. Appl. No. 17/467,316.(2 Pages).
Third Party IDS Submission under 37 CFR 1.290 filed on Aug. 15, 2022 From the U.S. Patent and Trademark Office Re. U.S. Appl. No. 16/494,310.(2 Pages).
Third Party IDS Submission under 37 CFR 1.290 filed on Aug. 15, 2022 From the U.S. Patent and Trademark Office Re. U.S. Appl. No. 17/322.966.(2 Pages).
USPTO Communication dated Aug. 8, 2022 RE Third-Party Submission From the U.S. Patent and Trademark Office Re. U.S. Appl. No. 17/467,316.(2 Pages).
USPTO Communication dated Aug. 17, 2022 RE Third-Party Submission From the U.S. Patent and Trademark Office Re. U.S. Appl. No. 16/494,310.(2 Pages).
USPTO Communication dated Aug. 17, 2022 RE Third-Party Submission From the U.S. Patent and Trademark Office Re. U.S. Appl. No. 17/322,966.(2 Pages).
Baldwin "Bridging the Path to a Silicon Future". IMI 17th Annual Ink Jet Printing Conference, 28 P., Feb. 7, 2008.
Barberan "Auszug Auftragsbestaetigung Brohl Master Curing Primer". Barberan, 3 P., Nov. 15, 2018.
Barberan "Auszug Webseite Wellpappenmaschinentyp". Barberan, 1 P.
Barberan "Barberan Screenshots". Barberan, 4 P., 2020.

Barberan "BIJ-INKJET Modular Digital Printing Systems", Barberan. 7 P., 2020.
Barberan "Catalogues", Barberan, 9 P., Mar. 31, 2020.
Barberan "First Barberan Jetmasters in Germany", Barberan, Machine Translation, 2 P., Mar. 16, 2021.
Barberan "Heads in Machine: Y Positition Offset", Barberan, Jetmaster Series, Screenshot.
Barberan "Jetmaster 360 Printing Software Manual", Barberan, 58 P., Dec. 5, 2017.
Barberan "Jetmaster 360", Barberan, English Translation and Design, 12 P., Sep. 6, 2021.
Barberan "Jetmaster Series A", Barberan, 1 P., 2020.
Barberan "Jetmaster Series Catalogue", Barberan, 8 P., 2020.
Barberan "Jetmaster Series Waveform Configuration File for Seiko RC1536 and 1024GS", Barberan, 1 P., Sep. 6, 2021.
Barberan "Screenshot User Interface", Barberan, 1 P.
Barberan "Barinsa—Waveform Report", Barberan Jet Master Series, 14 P., Sep. 2020.
Barberan. "Single Pass Jetmaster Series", Barbera, 5 P., 2020.
Boards of Appeal of the EPO "Beschwerdekammer/Communication of the Board of Appeal 19.06.2019", Complaint file No. T0665/15-3.2.05.
Boards of Appeal of the European Patent Office "Opinion Board of Appeal", Boards of Appeal of the European Patent Office, English Translation, 22 P., Jun. 19, 2019.
Dennis van Ijzerloo "Digital Printing Singlepass", DIPA Symposium, English Translation, 35 P., Aug. 7, 2019.
Dreiss Patentanw?lte PartG mbB "Action for Annulament of the DE Part of EP 2313281", Dreiss Patentanw?lte PartG mbB, English Translation, 72 P., Oct. 2020.
Dreiss Patentanwälte PartG mbB "Action for annulment of the DE part of EP 2 313 281.Reference number of the action for annulment: 3 Ni 34/20 (EP)", Dreiss Patentanwälte PartG mbB, English Translation, 36 P., Jul. 19, 2021.
Düsseldorf Regional Court "Urteil/Judgemenet" Düsseldorf Regional Court, 25.11.2021-12:20 0211 87565 1260 Regional Court Duesseldorf 3. 3/82, Nov. 25, 2021.
Eladio Jesus "Histogram Tool Description", Barberan, 4 P., Jun. 1, 2021.
Epson "Variable Sized Droplet Technology", Epson, 3 P., 2022.
European Standard "Chipboard Definition and classification German version EN 309", European Standard, English Translation, 11 P., Aug. 1992.
Federal Patent Court "Nichtigkeitsklage gegen den DE-Teil des EP 2 313 281 Aktenzeichen der Nichtigkeitsklage: 3 Ni 34/20 (EP) or Action for annulment of the DE part of EP 2 313 281 Reference number of the action for annulment: 3 Ni 34/20 (EP), In response to the defendant's statement of opposition of Apr. 9, 2021", Jul. 19, 2021.
Finsa "Catalogue", Finsa, 11 P., Mar. 4, 2022.
Finsa "Data Sheet MDF-Board", Finsa, 4 P., 2008.
Global Graphics "Global Graphics News Release ", Global Graphics, 3 P., Jul. 10, 2018.
Global Graphics "How to Mitigate Artifacts in High-Speed Inkjet Printing: a White Paper 4th Edition", Global Graphics, 16 P., Sep. 2019.
Kruss "Client Application Report", Kruss. 12 P., Oct. 20, 2020.
Kruss "Determination of Droplet Sizes with DSAInkjet", Kruss, 4 P., Oct. 20, 2020.
Laminat Magazin "Himmen Prospect", Laminat Magazin, 2 P., 2009.
Li&Co AG "MICODUR, Li&Co AG Confirmation of Purchase", Li&Co AG, 2 P., Sep. 8, 2021.
Lintec "Lintec Adhesives and Bonding", Lintec. 2 P., Mar. 2020.
Lintec "Lintec Product Information", Lintec, 4 P., 2020.
Meteor "MetCal for Print Calibration & Nozzle-Out Compensation", Meteor, 2 P., 2022.
Mimura et al. "Micro-Piezoelectric Head Technology of Color Inkjet Printer", International Conference on Digital Production Printing and Industrial Applications, 230-234 P., 2001.
Oji Tac Co.,Ltd. "Oji Tac", product information, Oji Tac Co.,Ltd., retrieved from the internet on Feb. 25, 2022.

(56) References Cited

OTHER PUBLICATIONS

PrintFlat "Corrects Inkjet Non-Uniformity Across the Web". PrintFlat. 7 P., Sep. 29, 2021.
Printing Industries of America "2019 Intertech Technology Award", Printing Industries of America, 34 P., 2019.
Seiko "508GS Greyscale Series Of Printheads", Seiko, 2 P., Sep. 18, 2020.
Seiko "Seiko, 508GS Greyscale Series Of Printheads, 2020", Seiko Holdings Group, Sep. 18, 2020.
SII Printek Inc. "Product Lineup—Inkjet Print Head—SII Printek Inc." retrieved from the internet on Mar. 8, 2021.
Toshiba "Brochure of CA3", Toshiba, 2 P., Jan. 12, 2022.
Toyo Ink Europe Specialty Chemicals D26 LIOJET UH021-YL-A10. Safety Data Sheet, Toyo Ink Europe Specialty Chemicals, Jan. 3, 2017.
Wallace et al. "Photo Realistic Ink Jet Printing ThroughDynamic Spot Size Control", Microfab, 9 P., Jun. 26, 2008.
Wikipedia "Archimedes Theorem about Sphere and Circular Cylinder", Wikipedia, English Translation, 7 P., Mar. 16, 2021.
Wikipedia "Corrugated Fiberboard", Wikipedia, 9 P., 2022.
Wikipedia "Haftone", Wikipedia, 9 P., Retrieved from the Internet on Oct. 4, 2021.
Wikipedia "Holz", Wikipedia, retrieved from the internet on Apr. 8, 2021.
Wikipedia "Lintec". Wikipedia, Enghsh Translation, 3 P., Feb. 25, 2022.
Wikipedia "Medium-density fibreboard", Wikipedia, retrived from the internet on Jul. 4, 2022.
Wikipedia "Melamine Resin", Wikipedia, retrieved from the internet on Jul. 7, 2022.
Wikipedia "Melaminharz", Wikipedia, retrieved from the internet on Mar. 2, 2022.
Wikipedia "Mitteldichte-Holzfaserplatte", Wikipedia, retrieved from the internet on Mar. 3, 2022.
Wikipedia "Paper", Wikipedia, retrieved from the internet on Jun. 24, 2022.
Wikipedia "Papier", Wikipedia, retrieved from the internet on Apr. 8, 2021.
Wikipedia "Satz des Archimedes ⊃ber Kugel und Kreiszylinder" with machine-translation, Wikipedia, retrived from the internet on Mar. 16, 2021.
Wikipedia "Syntetic Paper", Wikipedia, retrieved from the internet on Feb. 25, 2022.
Wikipedia "Wellpappe, Wikipedia", retrieved from the internet on Apr. 8, 2021.
Wikipedia "Wood, Wikipedia", retrieved from the internet on Jun. 24, 2022.
Wikipedia "Yupo (manufacturer)", wikipedia, retrieved from the internet on Feb. 25, 2022.
Xaar "OperatingParameters for XAAR 1001", Xaar, 7 P., 2008.
Xaar "Press Release Ligna 2009", XAAR, 6 P., May 18-22, 2009.
Xaar "UserManual(Handbuch) XAAR 1001", Xaar, 67 P., 2007.
Xaar—Technologies "The Wayback Machine", Xaar—Technologies, retrieved from the internet on Jun. 9, 2021.
Xaar Technology "Prospekt XAAR 1001", Xaar Technology.
Official Action dated Oct. 13, 2022 from the U.S. Patent and Trademark Office Re. U.S. Appl. No. 16/865,356. (65 pages).

\* cited by examiner
† cited by third party

METHOD FOR PRODUCING A STRUCTURE ON A SURFACE

RELATED APPLICATION

This application claims the benefit of priority of German Patent Application No. 10 2019 206 431.0 filed on May 3, 2019, the contents of which are incorporated herein by reference in their entirety.

FIELD AND BACKGROUND OF THE INVENTION

The present invention relates to a method for producing a structure on a surface of a flat workpiece and a device for performing the method.

A decoratively coated wood-based material board is state of the art and is applied in manifold cases of application, for example, for producing furniture, flooring laminate, and wall, ceiling or outside panels. A typical example for these wood-based material boards is a chipboard which is coated by a decoratively printed paper. Alternatively, there are other types of fiberboards, for example MDF (medium-density fiberboards) or HDF (high-density fiberboards), as well as cement fiberboards and cement-bound fiberboards which are used, for example, in thicknesses of 3 to 50 mm for the various cases of application.

Besides a decorative coating, as, for example, a wood replication or a tile replication for stone-like seeming laminate flooring, in the most of these cases of application, it is desirable to also obtain a structure in the surface.

According to the state of the art, this is, e.g., produced in a melamine coating procedure by means of an embossing die. Thereby, for example, a paper printed with a wood optic is impregnated by a melamine resin, surface dried and, then, pressed to a chipboard by means of a die in a heating press. The result is a chip board having a thickness of 12 mm which is coated with a beech replication optic. Then, structures having a depth of usually 20 µm to 150 µm or 200 µm on the surface with the beech replication optic result from the die.

These structures are produced either wood-like independently from the actual printed kind of wood as so-called "all-over" structure. In accordingly expensive methods for high-class seeming products, a so-called synchronous pore upon which the die has a structure which is applied synchronously to the printed wood optic is also used. In this case, for example, a printed knothole is also actually deeper perceptible than the residual of the printed wood optic slightly standing higher.

Except from the so-called melamine press method, there are further methods for coating wood-based material boards. In a further known method, for example, a wood-based material board is lacquered, printed and then provided with a transparent top-coat lacquer layer. In order to obtain an according surface structure also here, there is the possibility to apply a structure by a structured top-coat lacquer roller. Such a method is for example described in DE 10 2007 019 871 A1.

DE 10 2009 044 802 A1 discloses a structuring procedure in which a surface structure is built by means of lacquer droplets dispensed to a surface of a workpiece. Thereby, a structure is generated by an envelope curve which is defined by the surface of all of the droplets.

Further already known is a method for producing a structure on a flat workpiece that is described in the DE 10 2015 110 236 A1. Thereby, the workpiece is first coated with a liquid base layer. Subsequently, by means of droplets sprayed on the base layer, for example, by an inkjet printer, a structure is brought into the base layer since the droplets displace the base layer when impinging onto it. Thereby, recesses then generating in their entirety a structure in the liquid base layer are brought into the structure. Subsequently, the base layer is fixed by an appropriate procedure so that the structure is also fixed therein. Thereby, the workpiece is provided with a structure.

From DE 10 2017 113 035 A1, a further method for producing a decorative surface is known. The surface generated thereby is formed with different gloss levels. In particular, a second coat of paint is applied onto a first coat of paint by which a surface of a workpiece has been coated, wherein the second coat of paint is applied in the form of droplets and distinguishes from the first coat of paint in its gloss level after the curing. A specific implementation of the here-disclosed method also includes steps in which a structuring of the surface is performed.

In the former state of the art, with a base layer with a layer thickness of 100 µm, structure depths of 20 to 100 µm are usually obtained by means of a digital structuring. In a sure industrial method, usually, structure depths of merely maximum 80 µm are achieved since it appeared that, by the droplets (depending on the material of droplets) dispensed onto the surface, an applied liquid base layer is not always displaced up to the solid layer located underneath, therefore, up to the actual workpiece. Instead, a displacement merely takes place until a depth of about 70 to 80% of the layer thickness of the liquid base layer. Thus, this corresponds merely to 70 to 80 µm.

Except from that, according to the prior art, the edges of the digitally brought in structure or the brought in recesses are rather rounded and are not very sharp-edged as desired. Especially in the reproduction of a natural wood structure or a wood pore optic, very sharp-edged pores are desired, wherein the measured difference in depth between the highest and the lowest place in the surface, therefore, in a direction perpendicular to the surface of the workpiece takes place across a very short spatial extension, therefore, parallel to the surface of the workpiece. In the products manufactured according to the state of the art, this difference in depth of, e.g., 100 µm appears across a spatial extension of, e.g., 40 to 60 µm, whereas, in case of a sharp-edged pore, this difference in depth should be obtained within a spatial extension of rather 10 to 20 µm.

SUMMARY OF THE INVENTION

Against this background, it is an object of the present invention to solve the above-mentioned problems and, in particular, to provide a possibility to bring in sharper structures compared to the known procedures.

This object is achieved by the subject-matters of the independent claims. Advantages further developments are subject matter of the subclaims.

For achieving the object, it is proposed that the sprayed on droplets remain as a kind of "placeholder" in the base layer until the curing of the liquid base layer, and, after the completed curing, they are removed by different methods. Thereby, it is prevented that a structure generated by the sprayed on droplets "dissolves" again before the curing of the liquid base layer or that the sharp-angularity of the pore is reduced by becoming blurred of the base layer before the curing.

According to the invention, a method for producing a structure on a surface of a workpiece is provided, the method having the following steps:

applying a liquid base layer on a surface of the workpiece;

spraying on at least one droplet into the not yet congealed base layer, wherein the at least one droplet at least partially, preferably completely, penetrates into the liquid base layer;

fixing the base layer; and at least partial removing the at least one droplet.

Also, according to the invention, a method for producing a structure on a surface of the workpiece is provided, the method having the following steps:

applying at least one droplet onto the surface of the workpiece;

applying a liquid base layer onto the surface of the workpiece, wherein the base layer flows around and preferably at least partially covers the at least one droplet;

fixing the base layer; and at least partial removing of the at least one droplet.

Both methods can also be preferably executed in combination so that, according to the invention, also a method having the following steps is provided:

spraying on at least one droplet onto the surface of the workpiece;

applying a liquid base layer onto the surface of the workpiece, wherein the base layer flows around and preferably at least partially covers the at least one droplet;

spraying on at least one further droplet into the not yet congealed base layer, wherein the at least one further droplet at least partially, preferably completely, penetrates into the liquid base layer;

fixing the base layer;

at least partially removing the at least one droplet and/or the at least one further droplet.

The spraying on of the droplet onto the workpiece and/or onto the liquid base layer preferably takes place according to a digital template being preferably attuned with a decorative image. The decorative image is preferably located on the workpiece, wherein it is covered by the liquid base layer and/or the droplets. Preferably, then, the base layer and/or the droplets are configured such that they are at least partially transparent when have been fixed so that the decorative image is visible. In this way, it is achieved that a possibly synchronous arrangement of the decorative image and the structure is achieved. For example, a structure of a knothole can very well be adjusted to an image of a knothole. Alternatively or additionally, a decorative image can also be arranged on the fixed base layer.

Preferably, the at least one droplet congeals when contacting the workpiece and/or the base layer, or it preferably imbibes a solid aggregate phase. However, the at least one droplet can also be fixed in a separate step or together with the base layer.

The fixing of the base layer and, also, of the droplets, can preferably be equated with their curing.

Preferably, the base layer and/or the at least one droplet further comprises a curable material, which, especially preferable can be cured or fixed by UV radiation and/or by drying.

Especially preferred, the base layer and the at least one droplet consists of different materials in this way that the base layer cures harder than the at least one droplet in a curing process.

Preferably, at least one recess is brought in by the spraying on the at least one droplet into the liquid base layer applied before, wherein the at least one recess is preferably filled completely by the at least one droplet. The geometry of the at least one recess can be influenced by variation of the momentum or of the speed of the at least one droplet and/or by variation of the dispensing volume or of the mass of the at least one droplet. Alternatively or additionally, it is conceivable to enlarge a recess in its depth or in the volume by spraying on several droplet at one spatial place (one above another) with regard to a recess only formed by one droplet.

If the at least one droplet is sprayed onto the surface of the workpiece before the application of the base layer, a recess in the base layer is generated thereby that the at least one droplet occupies a space on the workpiece or the surface of the workpiece, wherein the space cannot be occupied by the material of the subsequently applied base layer. If the at least one droplet is at least partially removed after the fixing of the base layer, a notch or just a recess remains in the base layer.

The structure in the base layer is preferably formed by the at least one recess. Wood or tile decors or also other decorative structures can, for example, be formed by arranging several recesses or also by the connection of several recesses.

Preferably, the layer thickness of the base layer changes at the place where the at least one droplet has been sprayed on.

Preferably, several droplets are placed at the same spatial place in the liquid base layer and/or on the workpiece one above the other so that, before the application and/or the fixing of the base layer, a combined droplet results. The combined droplet preferably comprises a height h which can be calculated as follows:

$$h = n \times D$$

Thereby, n is the number of the droplets placed one above the other and D is the diameter of one of these droplets. Hereby, it was assumed that the droplets have an equal size, however, it is also conceivable that droplets having different sizes are combined in this manner.

Preferably, before the spraying on of the at least one droplet, a further processing step in which a solidification of the base layer takes place insofar as the base layer has a higher viscosity than when being applied onto the workpiece, however, it is not yet congealed. This can take place, for example, by drying or cooling the base layer by means of a flow source, such as a blower. Alternatively or additionally, heat can be detached from the base layer by exposing it to a reduced ambient temperature. Thereby, it can preferably be achieved that, on the one hand, the temperature of the base layer is lowered so that the at least one droplet hits onto a relatively cold base layer. On the other hand, a recess which has been brought in into the base layer by the at least one droplet is more resistant until the fixing than upon a base layer having low viscosity.

The spraying or the applying of the at least one droplet onto the liquid base layer preferably takes place by a digital printing or inkjet printing technique. Thereto, preferably, a digital print head or a digital nozzle beam is used.

Preferably, the at least one droplet is sprayed on with a temperature of >40° C., preferred >60° C., especially preferred >90° C., wherein the liquid base layer and/or the workpiece has/have a temperature of <40° C., preferably <35° C., especially preferred <30° C. The higher the temperature of the at least one droplet is, the better it can be printed by means of digital printing or inkjet printing technique. A possibly low temperature of the base layer and/or of the workpiece preferably accelerates the cooling down, particularly preferred the congealment, of the at least one droplet.

Preferably, the congealment of the at least one droplet takes place when contacting the base layer and/or the workpiece within less than 8 seconds, preferably within less than 3 seconds, especially preferred within less than 0.5 seconds. The faster the at least one droplet imbibes a solid aggregate state, the faster the further processing steps can be performed. Preferably, the melting point of the at least one droplet is above the temperature of the liquid base layer with which it comes into contact. In this manner, the at least one droplet is not liquefied once again due to the temperature. The congealment of the at least one droplet takes place the faster the lower the temperature of the base layer is.

Preferably, the at least partially removing of the at least one droplet takes place by means of mechanical and/or chemical and/or physical techniques, wherein, optionally, also the material of the base layer is removed.

Preferably, thereto, after the fixation of the base layer, the at least one droplet is re-liquefied or at least partially liquefied by means of a solvent. So, it can subsequently be removed from the base layer, especially preferred, by sucking.

By mechanical techniques, removing techniques can be understood. For example, the application of a grinding or planing technique can be understood, whereby material of the base layer and/or of the at least one droplet is removed. Further, also techniques deploying a medium in order to remove the material can be understood. For example, the surface of the base layer and/or of the at least one droplet can be treated by means of sandblasting. Upon removing by grinding means, preferably, a continuous working grinding machine, as typically used for grinding lacquer of lacquered chipboards for the field of furniture, is deployed. Manufacturers of such lacquer grinding machines are, for example, the companies Heesemann (Bad Oeynhausen), Fa. Büttfering (Homag AG Groupe).

Preferably, the base layer is removed up to a defined depth so that, subsequently, the at least one droplet, as far as it is congealed, is exposed and preferably protrudes from the base layer. In this manner, the at least one droplet can easily be removed by a physical or mechanical force effect, for example, by sucking or brushing out.

By the removing of parts of the fixed base layer, preferably of flat areas of the fixed base layer, it can be achieved that the at least one recess formed by the at least one droplet has a sharply slanting flank, whereby the sharpness of the structure demanded at the beginning can be achieved.

Preferably, the at least one congealed droplet is at least partially liquefied by reheating before and/or during the at least partially removing and, so, it is removed out of or from the base layer. Thereby, the removing preferably takes place by means of physical techniques, such as sucking, evaporating, or also by absorbing or sucking up the at least one liquid droplet by another material. If the at least one droplet is not congealed or fixed in the base layer but it is present in a liquid form, the at least one droplet can be removed in the same manner. Merely, the necessity for previously re-liquefying the at least one droplet is dropped.

A removing of the at least one droplet can also include chemical techniques or can take place by means of a chemical technique. Therefore, for example, a part of the base layer and/or of the at least one droplet can be liquefied by means of chemicals and, subsequently, removed in a liquid form. Upon especially suitable material mixtures, preferably having a high ratio of more than 30% Isophorone diamine, a good water solubility exists so that the droplet can be washed out from the fixed base layer by means of water.

Preferably, the at least one droplet consists of a material, preferably out of an acrylate mixture, which cannot be stimulated to the curing, in particular to the polymerization, by means of UV radiation. Alternative embodiments are mixtures preferably including at least 20% Isophorone diamine, or, alternatively, paraffin/EVA-mixtures (so-called "Hotmelt—Inks"). If the at least one droplet shall remain liquid during performing the method, in particular, during the fixing of the base layer, in a specific embodiment, the at least one droplet can include water or can consist purely of water.

Preferably, the liquid base layer encloses the at least one droplet as soon as it is located on or in the base layer or as soon as the base layer is brought onto the surface of the workpiece with the already sprayed on droplet such that an opening having a smaller area than a vertical upward projection of the at least one droplet remains in the base layer. Alternatively or additionally, the liquid base layer completely encloses the at least one droplet. Thus, the at least one droplet is enclosed in the base layer. If the at least one droplet is sprayed on the liquid base layer, the at least one droplet is surrounded or enclosed by a subsequent flowing around of the liquid base layer. The spraying of several droplet onto the liquid phase layer can preferably take place such that depending on the dispensing parameters of the droplet, as, e.g., droplet speed, droplet volume, etc., some of them penetrate into the base layer and are surrounded thereby, whereas others are partially or not surrounded.

Preferably, the at least partial removing of the at least one droplet takes place by a first mechanical removal preferably of 1 to 50 µm, preferred of 5 to 10 µm, of the cured base layer, especially preferred by means of a grinding device optionally followed by a mechanical or brushing out of the such exposed at least one droplet.

Alternatively or additionally, the at least partially removing of the at least one droplet takes place by thermal heating and sucking of the at least one droplet which is then re-liquefied.

Preferably, the base layer is fixed in such a manner that, after the fixing of the base layer, the surface of the fixed base layer does not have a larger unevenness than maximum 20 µm by the at least one droplet remaining in the base layer.

Preferably, the base layer is fixed in such a manner that an area comprising the at least one droplet has another hardness grade at least of a factor 2 with respect to an area without applied droplet. The hardness grade can thereby be determined by a "Hamberger Hobel". Thereby, a tip is pressed onto a workpiece with a force of 0.5 to 5 N and, subsequently, a scratch test is performed. Subsequently, the result is optically examined. Thereby, the hardness grades can be influenced by different constitutions of the materials of base layer and droplet so that, for example, different hardness grades can be achieved upon the polymerization of these materials.

Preferably, after the curing or the fixing in the base layer, the at least one droplet has another gloss grade than the cured base layer. This is then advantageous when the at least one droplet shall at least partially remain in the base layer and, thus, a brought-in recess shall be provided with another gloss grade with respect to the surrounding base layer. For example, the at least one droplet could only be liquefied to a certain depth which is less than the entire depth of the recess and, subsequently, be sucked up. The non-liquefied part of the at least one droplet would remain in the recess in the base layer and would provide the bottom of the recess with a different gloss grade here.

Thereby, the gloss trade of the at least one droplet preferably differs at least about 10 Gloss Units, preferably at least 20 Gloss Units, from the gloss grade of the fixed base layer, wherein the Gloss Units are measured according to DIN EN ISO 2813:2015 02 at an angle of 60°. Thereby, an optically clearly perceptible gloss effect is perceptible. The adjustment of the gloss grade can be varied when printing by the droplet size and/or the number of droplets per area or by the use of matting agents.

Gloss is measured according to DIN EN ISO 2813: 2015-02. For the gloss measurement, the amount of light reflected by a surface with respect to a reference standard from polished glass is measured. Thereby, the used unit of measurement is GU (Gloss Units or gloss units). The amount of light reflected from the surface depends on the angle of incidence and the properties of the surface. For gloss measurement, different angles of incidence (20°, 60°, and 85°) can be used in order to detect the reflectance, wherein, preferably, the measurement is performed at an angle of an incidence of 60°. Alternatively, the average value of measurements at the three angles of incident can also be used. The reflectance compares the light energy emitted from and received by a gloss meter in percent at a certain angle of incidence.

Preferably, the at least one congealed or cured droplet is more elastic or soft compared to the cured or fixed base layer. This has the advantage that the at least one droplet can be deformed more easily upon, e.g., an impact of a force, whereby a removing of the at least one droplet from the base layer is facilitated.

Preferably, the at least one droplet, preferably during being congealed or fixed, undergoes a volume reduction. In such a manner, it can be achieved that the at least one droplet is located with backlash in the fixed base layer, whereby it can be removed more easily therefrom. A volume change can be initiated, for example, by UV radiation impinging onto the at least one droplet. A further possibility would be to configure the at least one droplet such that the volume reduction takes place by heat withdrawal or heat supply.

According to the invention, a device for producing a structure on a surface of a workpiece is provided, the device comprising:
- an application unit configured to apply a liquid base layer onto a surface of the workpiece;
- a dispensing unit configured to spray at least one droplet into the base layer not yet congealed;
- a fixing unit configured to fix the liquid base layer;
- a processing unit configured to at least partially remove the at least one droplet;
- a control unit configured to control the device according to the above described method.

Preferably, the dispensing unit is provided with one or several rows of print heads respectively across the entire width of the workpiece.

Preferably, the device comprises a transport unit configured to feed the workpiece to the application unit, the dispensing unit, the fixation unit and the processing unit, wherein the transport unit preferably comprises a conveyor belt.

Preferably, the application unit comprises an application roller, a digital print head and/or a digital nozzle beam by which the liquid base layer can be applied onto the workpiece.

Preferably, the dispensing unit comprises a digital print head and/or a digital nozzle beam by which the spraying on of the at least one droplet into the base layer can take place.

Preferably, the fixation unit comprises a UV light source, a heat source and/or flow source by which a fixation or curing of the base layer can take place. Additionally, curing of the at least one droplet can also be performed thereby when the droplet is configured to cure by one of these methods. Thereby, a heat source can preferably comprise an infrared radiator or a heater, wherein the heat source is preferably configured for drying the base layer and/or the at least one droplet. A flow source can preferably comprise a blower configured to ventilate the base layer and/or the at least one droplet by a medium, preferably air. The flow source is preferably configured for drying the base layer and/or the at least one droplet.

Preferably, the processing unit comprises a brush, a suction device, a removal device, such as a grinding device or plane device or also a sandblast device, a device for dispensing a substance onto the base layer and/or the droplet, the substance being configured for a chemical reaction with the base layer and/or with the droplets, and/or a heat source. Therefore, preferably, the surface of the base layer can modified such that, for example, by removal of material, the at least one droplet is exposed. Also a pure reworking of the base layer and/or the at least one droplet in view of decorative aspects is possible.

BRIEF DESCRIPTION OF THE SEVERAL VIEWS OF THE DRAWINGS Below, the invention is elucidated by means of preferred embodiments by means of the attached drawings.

In particular.

DESCRIPTION OF SPECIFIC EMBODIMENTS OF THE INVENTION

Figure 1:
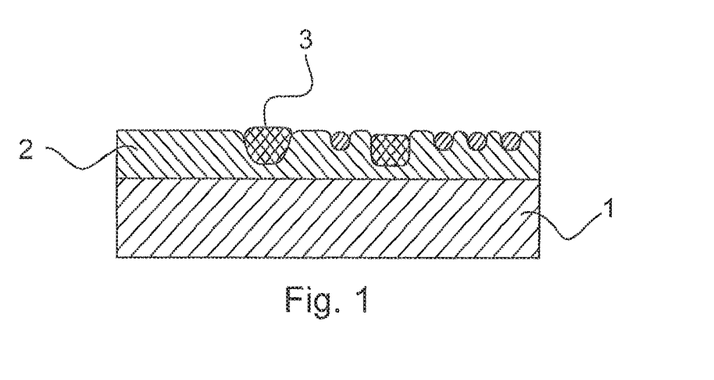
FIG. 1 shows a workpiece with a liquid base layer into which liquid droplets have been sprayed.

FIG. 1 shows a workpiece 1 with a liquid base layer 2 onto which liquid droplets 3 have been sprayed. These droplets 3 locally displaced the liquid base layer 2, whereby recesses arise. The droplets 3 partially fill out the recesses arisen by the spraying on, for example up to 50% of the height or of the volume of the recess, or up 100% of the height or of the volume of the recess so that a basically smooth surface results after the spraying on of the droplets 3 and before the curing of the liquid base layer 2.

Figure 2:
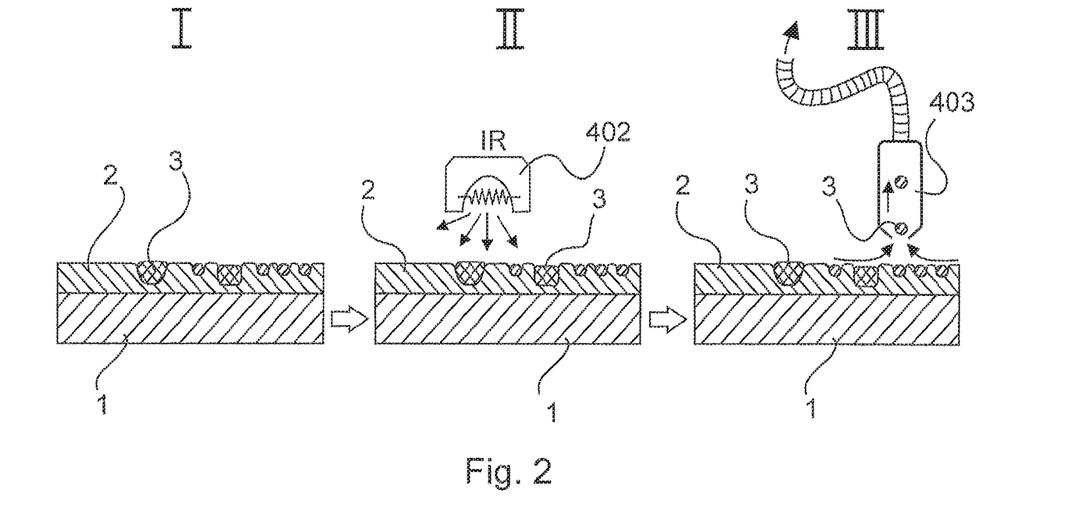
FIG. 2 shows a possibility to remove again the sprayed droplets.

FIG. 2 shows, in the view I on the left side, a workpiece 1 according to FIG. 1 with the sprayed on droplets 3 and with an already cured liquid base layer 2. This workpiece 1 is conveyed to a heat source 402 in the form of an infrared lamp which is illustrated in view II above the workpiece 1. Below this heat source 402, the surface of the workpiece 1, in particular, the base layer 2 and the droplets 3 are reheated by the infrared radiation. By the heating, the droplets 3 are re-liquefied, whereby the base layer 2 cured in the meantime remains solid. Subsequently, the workpiece 1 with the liquid droplets 3 is conveyed to a suction device 403, shown in view III on the right side, where the again liquid droplets 3 are sucked up. In this way, the droplets 3 can be completely or also only partially removed from the base layer 2. Upon partially removing, attention should be paid to not to liquefy the entire droplet 3.

Figure 4:
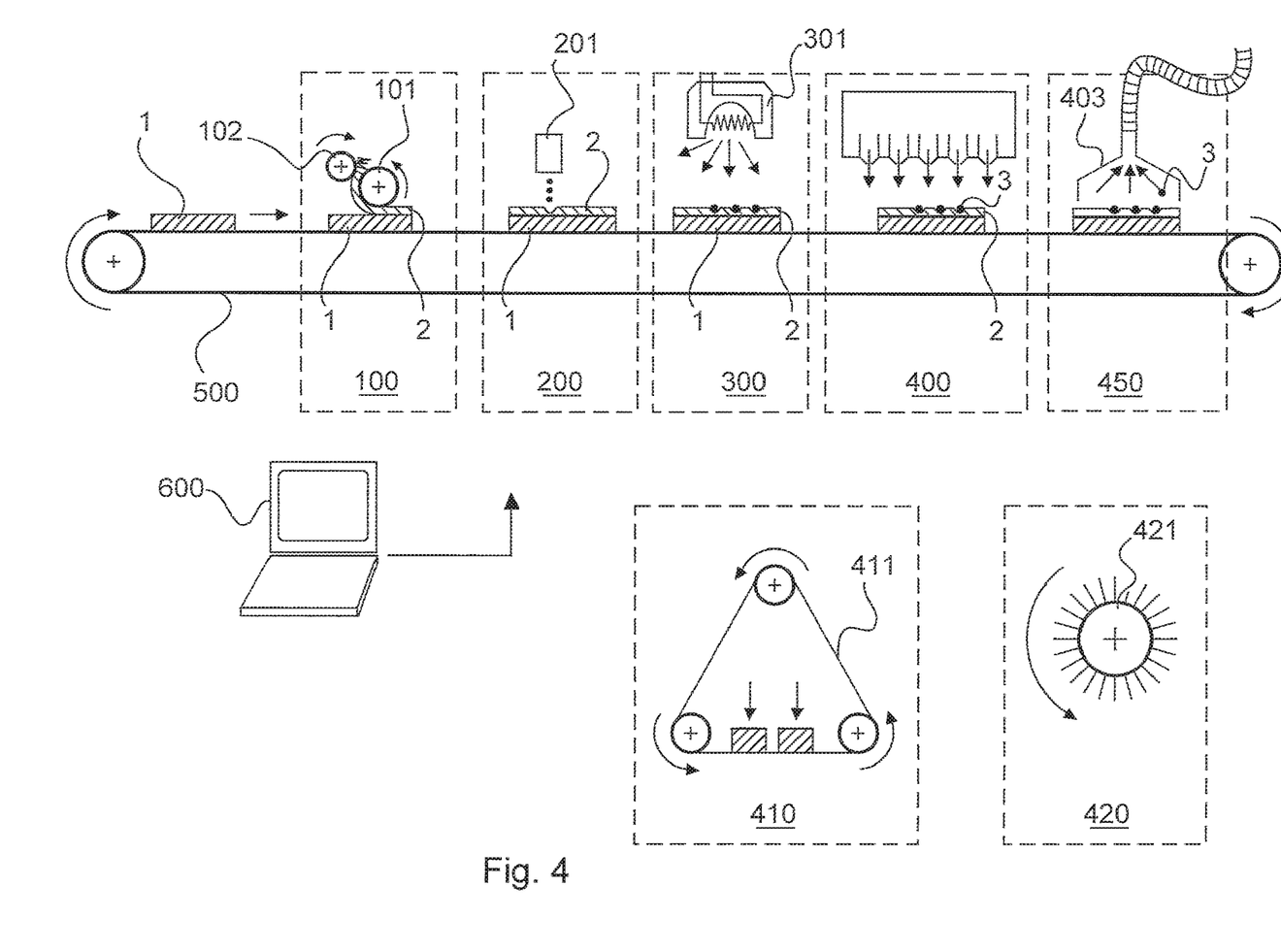
FIG. 4 shows a device according to the invention for performing the method.

Such an arrangement of heat source 402 and suction device 403 can, for example, be provided in a device as shown in FIG. 4 for performing the method according to the invention.

Figure 3A:
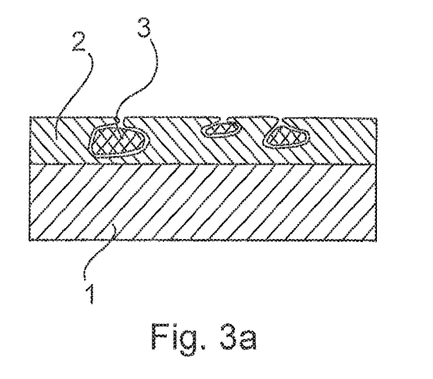
FIG. 3a shows a workpiece with a liquid base layer into which liquid droplets have been sprayed, wherein the liquid base layer at least partially encompasses the droplets.

FIG. 3a shows a workpiece 1 with a liquid base layer 2 into which liquid droplets 3 have been sprayed. In contrast to the configuration in FIG. 1, the liquid base layer 2 has shut again at least partially above the droplets 3 before the fixation. While the two droplets 3 on the right side are completely enclosed by the base layer 2, no complete closing of the surface of the base layer 2 can be recognized above the left droplet 3. Here, above the droplet 3, an orifice, the area of which in a vertical upward direction is however smaller than an area of a vertically upward projection of the droplet 3, remained.

Figure 3B:
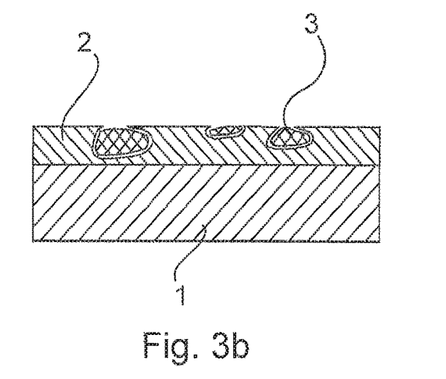
FIG. 3b shows the same workpiece as in FIG. 3a after a further processing step.

FIG. 3b shows the workpiece 1 from FIG. 3a after a mechanical machining performed, for example, by a grinding machine, following to the fixation of the base layer 2. By this machining, a determined amount of material of the base layer 2 has been removed so that the penetrated droplets 3 have been exposed again.

The exposure of the droplets 3 can, thereby, take place such that only so much material of the base layer 2 is removed that the droplets 3 are admittedly visible, however, they have not been exposed across their entire cross-sectional area. This result is shown in FIG. 3b. Thereby, it can be clearly recognized that the recesses of the base layer 2 form undercuts filled by the droplets 3. If the droplets 3 are removed from the base layer 2 subsequently, as, for example, shown in FIG. 2, the undercut remains in the base layer 2 which can achieve a decorated effect.

Alternatively thereto or in other areas of the base layer 2, also so much material can be removed that the droplets 3 are exposed with their entire upwardly projected cross-sectional area. Then, no undercut remains in the recess. Instead, an edge sharply slanting into the recess is generated. In this manner, a sharp contour, for example of a woodgrain, can be depicted.

FIG. 4 shows a device according to the invention for performing the method according to the invention.

The device is formed as a production line comprising individual units 100, 200, 300, 400, 450 configured to perform the individual method steps. Alternatively or additionally, the device can also comprise the units 410 and 420.

The device further comprises a transport unit 500 configured to convey a workpiece 1 to the individual units 100, 200, 300, 400, 450.

Further, the device comprises a control unit 600 configured to control the individual units 100, 200, 300, 400, 450, 500 for performing the corresponding method steps or for initiating the performing of the method according to the invention in the device.

In the shown illustration of the device, the transport unit 500 comprises a conveyor belt extending from the left to the right and being configured to convey workpieces 1 to this individual units 100, 200, 300, 400, 450 from the left to the right in a conveying direction.

In the conveying direction, first, an application unit 100 configured to apply the base layer 2 in a liquid form onto the workpiece 1 is shown. In the illustrated embodiment, the application unit 100 comprises a rotating application roller 101 by which the base layer 2 is applied onto the upwardly pointing surface of the workpiece 1 as well as a counter pressure roller 102. Thereto, the application roller 101 unrolls on the surface of the workpiece 1. However, in an alternative embodiment, alternatively or additionally, the application unit 100 can also comprise other elements configured for application of the base layer 2. In particular, digital print units, as a digital print head or a digital nozzle beam, which apply the base layer 2 onto the workpiece 1 instead of the application roller 101 or additionally to it can be provided. Alternatively, the application unit 100 can also be formed as a casting machine in which the workpiece 1 is moved through a lacquer curtain.

Thereby, in a preferred embodiment, parameters of the base layer 2, in particular, the amount of material or the thickness of the layer or the temperature of the base layer 2 when being applied onto the workpiece 1 can be influenced by the application unit 100.

In the conveying direction, a dispensing unit 200 configured for dispensing the droplets 3 into the not yet congealed base layer 2 follows on the application unit 100. For dispensing the droplets 3, the dispensing unit 200 comprises one or several digital print head or print heads and/or, as the case may be, arranged one after another in the conveying direction, one or several digital nozzle beams with several digital print heads which can dispense or spray on the droplets 3 onto the base layer 2, the digital print heads extending across the width of the workpiece. Thereby, the dispensing unit 200 is configured such that the droplets 3 penetrate into the not yet congealed base layer 2 such that they displace the base layer 2 and form recesses therein, the recesses being at least partially filled by the droplets 3. The dispensing unit 200 (or digital print station) can further be configured such that the droplets 3 penetrate into the not yet congealed base layer 2 such that they are at least partially enclosed by the base layer 2.

In a preferred embodiment, thereby, parameters of the droplets 3, in particular, the volume of the droplets or the mass of the droplets or the dispensing or impingement speed onto the base layer 2 can be influenced by the dispensing unit 200. The volumes of the droplets can preferably be controlled within a range of 3 to 200 pL (Picoliter), the impingement speed is preferably in the region of 2 to 10 m/s, especially preferred in the region of 3 to 5 m/s.

In the conveying direction, a fixation unit 300 configured to fix the base layer 2 follows on the dispensing unit 200. For fixing the base layer 2, the fixation unit 300 comprises at least one UV light source 301, as, e.g., a LED UV radiator. Thereby, the at least one UV light source 301 radiates UV light onto the base layer 2 and initiates curing or polymerization procedures therein, whereby the base layer 2 which at least has not been congealed before the radiation by UV light solidifies and cures now or by which the base layer 2 is fixed. Alternatively or additionally, also a heat source and/or a flow source can be provided. The heat source, for example, an infrared light source or a heater is configured to emit heat to the workpiece 1, the base layer 2 and/or the droplets 3. The flow source, for example, a blower, is configured to let flow air or another gas or medium for drying over the base layer 2 and/or the droplets 3 in order to achieve drying or also a fixation by means of drying of the base layer 2 and/or of the droplets 3.

In an especially preferred embodiment, thereby, the parameters with which the fixation unit 300 is operated, in particular, the energy or wavelength of the emitted UV radiation of the at least one UV light source 301, the emitted energy of the heat source, the mass flow or the flow speed or the temperature of the flowing medium of the flow source, can be influenced by the fixation unit 300. Usually, the wavelength of the UV radiation lies in the UV-A and, as the case make be, in the UV-B region, i.e., 280 nm to 400 nm. The power of the UV radiators for a production velocity of 20 m/min is at about 2× to 5×200W/cm working width, i.e., upon a width of a workpiece of 135 cm, a requested power of the UV radiators of about 50 to 125 kW results.

In a preferred embodiment, the fixation unit 300 is configured to fix, except the base layer 2, also the droplets 3.

In the conveying direction, a processing unit configured to rework the workpiece 1 with the located thereon fixed base layer 2 and droplets 3 follows on the fixation unit 300.

Thereby, a reworking step is the at least partial removing of the droplets 3 from the base layer 2. Thereto, the processing unit comprises various elements. In the here shown embodiment, the unit 400 is formed as a nozzle channel having a heat gun in order to reheat and liquefy the congealed droplets 3 after the fixation of the base layer 2. In the downstream unit 450, the such liquefied droplets 3 are sucked up again. This takes place by a suction device 403 already mentioned in FIG. 2.

In an alternative embodiment, a processing unit can also comprise the units 410, 420. These can also be provided additionally to the units 400, 450. The unit 410 is thereby formed as a grinding device (grinding machine). Thereby, the unit 410 comprises a circulating abrasive belt 411 which runs synchronously or in counter direction to the workpiece 1 guided on the transport device 500. In this way, material can be removed from the base layer 2, whereby the droplets 3 and the base layer 2 can be at least partially exposed.

The unit 420 comprises a brush 421, here, formed as a rotating brush roller. The brush 421 is configured such that it can remove the droplets 3 from the fixed or congealed base layer 2 by means of mechanical cooperation of bristles with the droplets 3. Thereby, the droplets 3 are preferably congealed in the base layer 2 so that the bristles of the brush 401 can easily engage the droplets 3.

However, the suction device 403 of the unit 450 can also be configured to suck the droplets 3 in solid form out of the base layer 2. This requires that the droplets 3 are configured such that they do not coalesce during the solidification.

Alternatively or additionally, the unit 410 can also comprise such a grinding device configured to at least remove a part of the congealed base layer 2 by grinding. Thereby, the removal of the base layer 2 preferably takes place in layers so that material of the base layer 2 is removed from above by grinding. Thereby, the grinding device can also be configured to remove, except the congealed base layer 2, also material of the droplets 3.

The grinding device is preferably configured to at least partially expose the droplets 3 if they have been at least partially encompassed by the base layer 2 before. Subsequently, the exposed droplets can then be completely or partly removed by means of a unit 420 by means of the rotating brush 421.

Alternatively or additionally, the processing unit also comprises a dispensing unit configured to dispense a substance onto the fixed base layer 2 and/or the droplets 3, wherein the substance is configured to undergo a chemical reaction with the base layer 2 and/or with the droplets 3. Alternatively, the substance can also be a solvent in order to bring the droplets 3 into solution and to subsequently suck them up by a unit 450. In this manner, the base layer 2 and/or the droplets 3 can at least partially be removed. However, alternatively or additionally, an optical and/or haptic modification of the base layer 2 and/or of the droplets 3 can be achieved.

In a preferred embodiment, the processing unit is configured to influence the amount of material removed from the base layer 2 and/or from the droplets 3.

The control unit 600, for example, comprises a control means, as, for example, here, an electronic control device in which a program code is present which, upon its execution, causes the control unit 600 to perform the method according to the invention.

In a not shown embodiment, the device can also be formed such that the application unit 100 is arranged only after the dispensing unit 200. In this way, the application of droplets 3 onto the workpiece 1 followed by an application of a liquid base layer 2 is possible. Also, an arrangement of dispensing unit 200, application unit 100 and a further dispensing unit 200 in the conveying direction can be possible in order to enable an application of droplets 3 onto the workpiece 1 and also onto the base layer 2.

The processing unit can comprise all above mentioned units 400, 410, 420, 450 in arbitrary order in the conveying direction or only a selection of these units 400, 410, 420, 450, wherein also a repetition of units 400, 410, 420, 450 in the conveying direction is conceivable.

Figure 5:
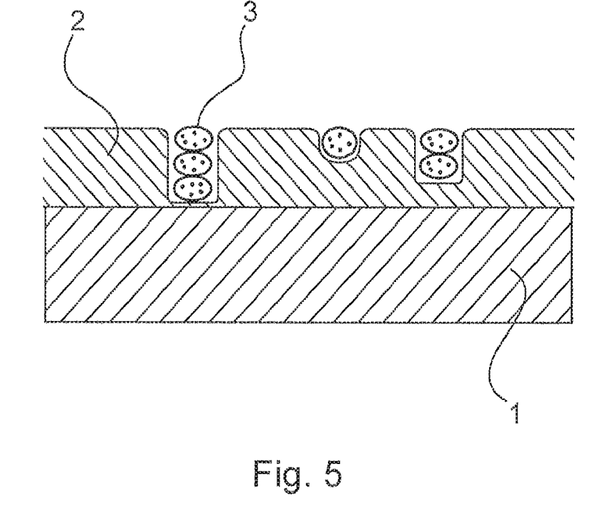
FIG. 5 shows a workpiece with a liquid base layer into which liquid droplets have been sprayed, wherein several droplets have been sprayed on at the same place.

FIG. 5 shows a workpiece 1 for a case of implementation in which several droplets 3 have been dispensed at the same spatial place and remain in the liquid base layer 2 on top of each other (left and right arrangement of the droplets 3). Here can clearly be seen that the droplets 3 have been stapled on top of one another so that a clearly deeper recess or a clearly deeper structure is generated in the base layer 2. In the left arrangement of the droplets 3, the recess also extends as deep as the surface of the workpiece 1.

Figure 6:
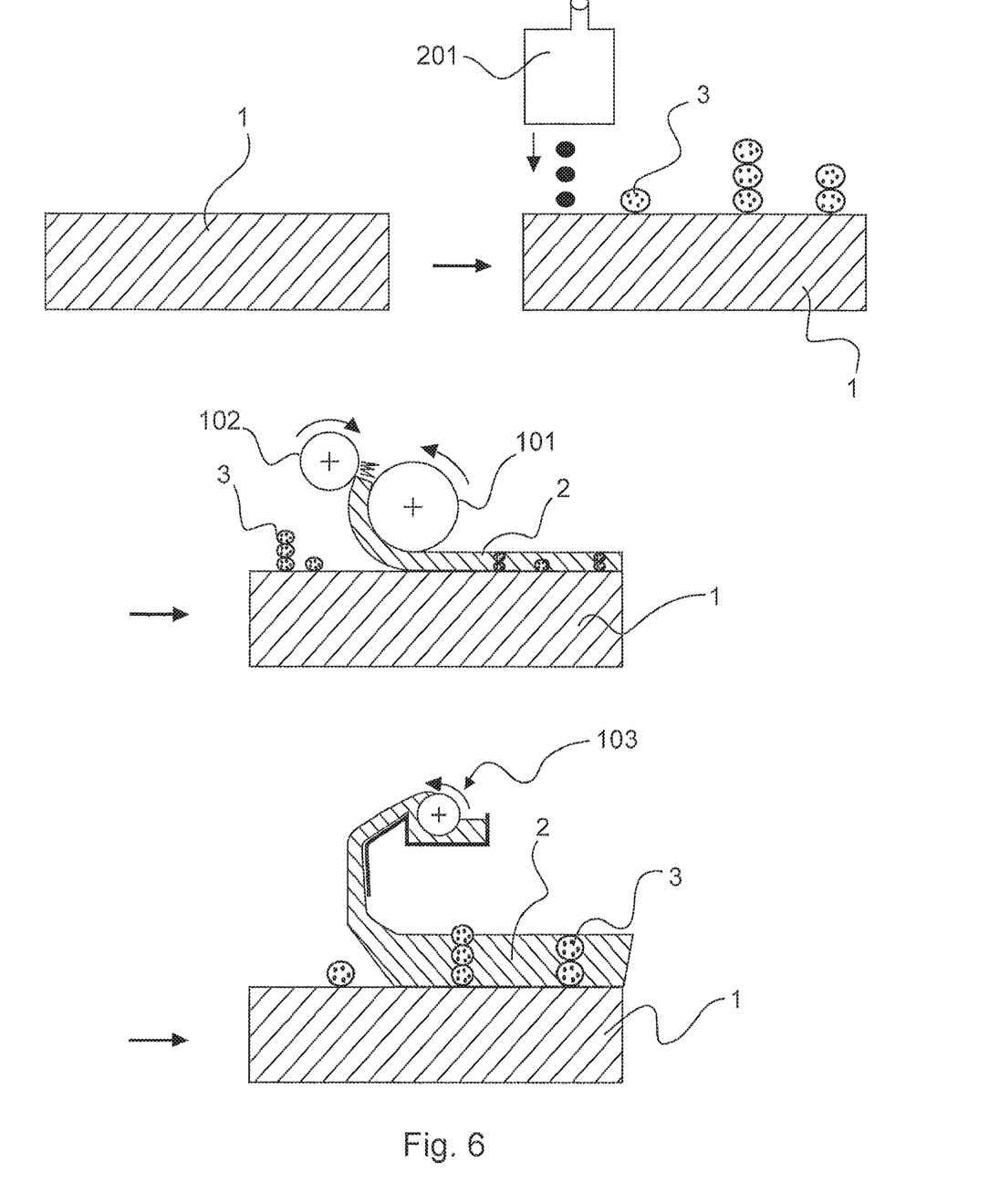
FIG. 6 shows a spraying of droplet onto a workpiece before the application of the liquid base layer and a possibility for applying a liquid base layer onto a workpiece.

FIG. 6 shows in the illustration on top spraying of droplets 3 onto a workpiece 1 before the application of a liquid base layer. Below, first, the application of a liquid base layer 2 onto a workpiece 1 by means of an application roller 101 is shown. The bottommost illustration shows a possibility to apply a liquid base layer 2 onto a workpiece 1 by means of a casting machine 103.

In the illustration on top, the workpiece 1 is fed to a digital print head 201 dispensing droplets 3 onto the surface of the workpiece 1. As illustrated, these can also be brought together to larger droplets or to more complex shapes.

The intermediate illustration shows an application of a liquid base layer 2 onto this workpiece 1. Thereby, the droplets 3 located on the surface of the workpiece 1 are accordingly flowed around by the liquid base layer 2. Thereby, the liquid base layer is applied onto the workpiece 1 by means of an application roller 101. As already elucidated above, the application roller thereby corresponds with a counter pressure roller 102. So, an application of the liquid base layer 2 takes place, wherein the application roller 101 unrolls on the surface of the workpiece 1, wherein the workpiece 1 moves through from the left to the right under the application roller 101.

In the bottommost illustration, the liquid base layer 2 is applied by means of a casting machine 103, wherein the casting machine 103 generates a curtain of the material of the liquid base layer 2, wherein the workpiece 1 is than moved through under the curtain from the left to the right.

Finally, the further description of the invention takes place by means of five specific embodiments.

Embodiment 1

A workpiece 1 in the form of a chipboard with a thickness of 12 mm is fed to a paint station. In the paint station, the chipboard is provided with a white basecoat on at least the surface. This basecoat is cured by means of a UV module. Subsequently, the so white-primed chipboard is digitally printed by a wood decor, for example oak or pine decor, in the digital printing procedure.

Subsequently, the workpiece 1 printed in this way is fed to a further paint station in which the liquid base layer 2 is applied onto the workpiece 1, namely, in the form of a UV curing acrylate lacquer according to the state of the art. As application amount, a value of more than 30 g/m² at a layer thickness of more than 30 μm, especially preferred more than 120 μm layer thickness, is chosen.

Subsequently, the workpiece 1 is fed to a digital print station including print heads with a liquid (ink) heated to 85° C. As ink, for example this one of the company Sunjet with the brand name Sunjet Crystal HEP9520 is chosen. From this print station, subsequently, a plurality of droplets 3 of the ink are dispensed according to a digital printing template onto the workpiece 1 with the liquid base layer 2, wherein, thereby, recesses of 30 to 120 μm are brought in into the still liquid base layer 2. The droplets 3 are applied at a temperature of more than 80° C. and congeal when impinging onto the liquid base layer having a temperature of 20 to 30° C. by cooling within less than 0.5 seconds in the recesses brought in by themselves.

Thereafter, the workpiece 1 is fed to a UV curing in which three UV lamps having a power of respectively 200 W/cm² cure the base layer.

Subsequently, the workpiece 1 with the cured base layer 2 is heated to more than 100° C. surface temperature in an IR station with infrared radiation so that the droplets 3 become liquid again. These liquid droplets 3 are then removed from the base layer 2 in a suction station.

Alternatively or additionally, the droplets 3 are removed by means of mechanical means, as, for example, a rotating brush.

In a further development of this embodiment, after the removal of the droplets 3, the workpiece 1 is fed to a grinding machine or a combined grinding/brush machine in order to generate grinding striae which make the structure produced according to the method of invention look more naturally.

Embodiment 2

The workpiece 1 in the form of a plastic board of a PVC mixture having a thickness of 5 mm and a surface imprinted before in a decorative manner is fed to a coating station.

Here, a liquid base layer 2 of a UV curing acrylate material according to the state of the art is applied, namely with a layer thickness of 40 to 300 μm, preferred with 90 to 120 μm.

The workpiece 1 coated in this way is subsequently conveyed to a digital print station where the liquid base layer 2 is structured according to a digital template by means of thereon emitted ink in the form of droplets 3. Thereby, the dispensed droplets 3 having a volume between 6 pL and 400 pL penetrate into the liquid base layer 2 such that the base layer 2 shuts again above them after the penetration of the droplets 3.

The droplets 3 are made of a material which consists of acrylate as an essential base. However, the droplets 3 do not include means for initiating a UV curing as this is the case upon the material of the liquid base layer 2.

In the subsequent UV station, therefore, the liquid base layer 2 is cured by means of UV LED radiators, whereas the enclosed droplets 3 remind liquid.

Subsequently, by means of a mechanical procedure using a grinding machine, the surface of the cured base layer 2 is grinded so far as the still liquid droplets 3 underneath are just exposed. In a further method step, the still liquid droplets 3 are brushed out by means of a brush.

In an alternative embodiment, the still liquid droplets 3 are removed by the application of a solvent and a subsequent sucking of the solvent.

Embodiment 3

A workpiece 1 in the form of a plastic board of a filled PP mixture (e.g., polypropylene with chalk) having a thickness of 4.2 mm, a length of 2.800 mm, a width of 1.350 mm and a surface painted in a uncolored manner is fed to a coating station. On and under the uncolored surface, further lacquer and/or primer layers can be applied.

In the coating station, a liquid base layer 2 of an UV-curing acrylate material according to the state of the art is applied, namely having a layer thickness of 100 to 150 μm. After the below described fixation by means of UV radiation, this material has a melting point of >300° C. The viscosity of this layer is at about 11 mPa s at a temperature of 85° C.

The workpiece 1 coated in this way is subsequently conveyed to a digital print station where the liquid base layer 2 is structured by means of ink dispensed thereon in the form of droplets 3 according to a digital template. The droplets consist in a ratio of 20-40% of Isophorone diamine and have a melting point of 88° C. They are available in the print station at a temperature of 95° C. and are dispensed out of digital print heads onto the liquid base layer 2 at this temperature. The distance of the print heads to the liquid base layer 2 is 1 mm to 10 mm, preferred 1.5 mm to 3 mm. The speed of the droplets 3 before the penetration into the liquid base layer 2 is 3 to 10 m/s, preferred 4 to 5 m/s. The dispensed droplets 3 have a volume between 6 pL and 400 pL, preferred 10 to 30 pL.

The digital print heads in the print station are configured such that the can dispense from one print head several droplets 3 on top of one another to one spatial place. Thereby, in the liquid base layer 2, a kind of "tower" out of droplets 3 lying one above another is formed, the height h of the tower is determined from $$h = n \times D,$$

whereby n: number of the droplets dispensed one above another at one place, and D: diameter of the droplets. In the preferred embodiment, for n=3 droplets having a respective volume of 80 pL and a diameter of 40 μm, a height h=120 μm results.

The digital print station is designed such that the print heads extend in one or several rows across the entire width of transport. In an embodiment according to the invention, the print heads of the company Xaar (type Xaar 1003) which have an effective printing width of 68 mm are used. Therefore, per row, 20 print heads are used in order to achieve a minimum printing width of more than the width of the workpiece of 1.350 mm.

In an alternative embodiment, three rows respectively having 20 print heads Xaar 1003 are used in the succession in the passage direction. Thereby, at a feeding speed of the workpiece 1 of 25 m/min, the print station can dispense respectively one droplet per place from the three print head rows at the same spatial place, wherein the droplets penetrate into the liquid base layer as described above, cure one above the other and achieve a total height of 3×D (diameter per droplet).

In all above mentioned embodiments, the workpiece 1 is conveyed through the printing station (cf. FIG. 4) at the above mentioned speed of 25 m/min. Thereby, at least one droplet 3 at one spatial place—or, as above alternatively shown, a quantity n of droplets 3 one above the other at one spatial place—is dispensed into the liquid base layer 2. By the continuous feeding speed and the continuously working print heads across the entire width of the workpiece, a "structure image" on the workpiece 1 created according to a digital template can be generated. That is, that, for example, at several places in the feeding direction linearly in succession, respectively three droplets 3 are placed one above the other and, thus, a straight "stroke" as a recess having a depth h=3×D arises. Alternatively, all structures which have been created in a digital template are possible.

In the subsequent UV station, therefore, the liquid base layer 2 is cured by means of UV LED radiators, whereas the droplets 3 have already been congealed before.

In a further method step, the congealed droplets 3 are brushed out by means of a brush.

In an alternative embodiment, the congealed droplets are liquefied again in a hot air channel having a nozzle temperature of 125° C. and are sucked up thereafter.

In a further alternative embodiment, the congealed droplets 3 are solvated again by the application of a solvent and removed by a subsequent suctioning of the solvent. In an especially preferred embodiment, the droplets 3 are of a water-soluble material so that, in particular, water is deployed as solvent.

Embodiment 4

In an alternative embodiment, the constitution of the droplets 3 can be selected as follows:
Paraffin/wax: 19%
EVA: 10%
polyamide resin: 29%
low molecular alcohol: 39%
additives (for degasifying): 3%

In this embodiment, the droplets are removed by means of mechanical means after the congealing and fixing of the liquid base layer 2, or, alternatively, they are re-liquefied by the heating in the hot air oven and, thereafter, removed by mechanical means and/or suction from the base layer 2.

Embodiment 5

In this embodiment, the droplets 3 are applied before the application of the liquid base layer 2.

A workpiece 1 in the form of an HDF board having a density of 850 kg/m³ in the dimensions of 8 mm thickness, 2450 mm length and 1550 mm width is fed to a digital print station. In advance, the HDF board is prepared by one or several paint or primer steps and, subsequently, digitally printed with a decorative image of a wood replication (for example, beechwood parquet three-rod). Alternatively, after this imprinting, an intermediate lacquer layer can also be applied.

In the digital print station, a plurality of droplets 3 having a volume between 12 pL and 40 pL are printed onto the decoratively printed surface in advance, namely according to a digital template. Thereby, between at least 100 up to 10,000 droplets per $cm^2$ area are applied. These droplets 3 consist of a paraffin mixture which is imprinted at a temperature of 80° C. and which congeals when contacting the surface within less than 3 seconds, preferred, less than 1 second.

In an alternative embodiment, the droplets 3 are applied according to a digital template which has been created from the digital image of the decorative surface printed by means of digital processing methods in advance. Thereby, it can be achieved that the droplets 3 are, for example, printed exactly there where the decorative image of the beechwood parquet has a knothole so that the structures generated later by the method according to the invention are synchronous to the underlying decorative image. Several droplets 3 at one spatial place can also be arranged one above the other so that the entire difference in height between the surface of the workpiece 1 and the highest point of the applied droplets achieves h=n×D, with h: difference in height, n: number of droplets one above another, and D=diameter of one droplet 3.

In an exemplary embodiment, for n =5 droplets 3 and a diameter per droplets of D=25 μm, a height h=125 μm results. A plurality of these such generated "towers" of droplets 3 lying one above the other are arranged side-by-side, longitudinally or across the feeding direction so that a structure of a plurality of a droplet chains and individual droplet agglomerations result on the workpiece 1. Thereby, the height of the individual "towers" can be different, namely by variation of the quantity of the droplets 3 one above the other and also by variation of the volume of the droplets and, therefore, of the diameter D of the droplets.

Subsequently, a liquid base layer 2 of a UV curing acrylate material according to the state of the art is applied, namely having a layer thickness of 120 μm. The liquid base layer 2 is applied by means of a casting machine in which a liquid curtain is generated by a dip roller and a casting lip (cf. 103 in FIG. 6). The thickness of the layer can be influenced and controlled by the viscosity of the material of the liquid base layer (here, UV curing acrylate lacquer according to the state of the art), by the numbers of revolution of the dip roller of the casting machine and by the feeding speed of the workpiece 1 (here HDF board).

In the subsequent UV station, the liquid base layer 2 is cured by means of UV LED radiators.

After the curing and the fixation of the liquid base layer, the droplets 3 are removed by mechanical means or, alternatively, are re-liquefied by the heating in an hot air oven and, subsequently, removed by mechanical means and/or section.

In an alternative embodiment, the still liquid droplets 3 are removed by the application of a solvent and subsequent suction of the solvent.

In a further alternative embodiment, the material of the droplets 3 is selected such that it starts shrinking upon radiation by UV radiation. Thereby, after the fixation of the liquid base layer 2, the droplets 3 lose contact with it and can be sucked up by simple means.

LIST OF REFERENCE SIGNS 1 workpiece
2 base layer
3 droplet
100 application unit
101 application roller
102 counter pressure roller 103 casting machine
200 dispensing unit
201 digital print head
300 fixation unit
301 UV light source
400 unit
401 brush
402 heat source
403 suction device
410 unit
411 abrasive belt
420 unit
421 brush
450 unit
500 transport unit
600 control unit

What is claimed is:

1. A method for producing a structure on a surface of a workpiece, the method having the following steps:
    applying a liquid base layer onto the surface of the workpiece;
    spraying on at least one droplet into the not yet congealed base layer, wherein the at least one droplet penetrates at least partially into the base layer,
    fixing the base layer; and
    at least partially removing the at least one droplet;
    wherein the method further having the following steps:
    spraying at least one another droplet onto the surface of the workpiece before applying the liquid base layer onto the surface of the workpiece, wherein the base layer flows around the at least one droplet and at least partially covers the at least one another droplet,
    at least partially removing the at least one another droplet.

2. The method according to claim 1, wherein by the spraying on the at least one droplet into the not yet congealed base layer, at least one recess is brought in, wherein the at least one recess is filled by the at least one droplet, and/or wherein the layer thickness of the base layer at the place where the at least one droplet has been sprayed on changes.

3. The method according to claim 1, wherein
    before the spraying on of the least one droplet, a further processing step in which a solidification of the base layer takes place insofar as the base layer comprises a higher viscosity than upon its application onto the workpiece, however, it is not yet congealed, takes place.

4. The method according to claim 1, wherein
    the at least one droplet is sprayed on at a temperature of >40° C. and the liquid base layer and/or the workpiece has a temperature of <40° C.

5. The method according to claim 1, wherein the at least partially removing of the at least one droplet takes place by means of mechanical and/or chemical and/or physical procedures, wherein, optionally, also material of the base layer is removed.

6. The method according to claim 1, wherein
    the at least one droplet consists of a material which cannot be stimulated to cure by UV radiation.

7. The method according to claim 1, wherein
    the liquid base layer encompasses the at least one droplet in such a manner that an orifice having a smaller area then a vertically upward projection of the at least one droplets remains in the base layer or that the liquid base layer completely encompasses the at least one droplet.

8. The method according to claim 1, wherein
    the base layer is fixed in such a manner that, after the fixation of the base layer, the surface of the fixed base layer has no unevenness larger than maximum 20 μm by the at least one droplet remaining in the base layer.

9. The method according to claim 1, wherein
    the base layer is fixed in such a manner that an area comprising the at least one droplet has a different hardness grade, preferably of at least a factor 2, with respect to an area without applied droplets.

10. The method according to claim 1, wherein
    the at least one droplet has another gloss grade than the fixed base layer after curing or fixation in the base layer.

11. The method according to claim 1, wherein
    at least two droplets are placed one above the other at the same spatial place in the liquid base layer and/or on the workpiece so that, before the applying and/or before the fixing of the base layer, a compound droplet results.

12. The method according to claim 1, wherein
    the at least one droplet is sprayed on at a temperature of >40° C. and the liquid base layer and/or the workpiece has a temperature of <40° C.

13. The method according to claim 1, wherein
    the at least partially removing of the at least one droplet takes place by means of mechanical and/or chemical and/or physical procedures, wherein, optionally, also material of the base layer is removed.

14. The method according to claim 1, wherein
    the at least one droplet consists of a material which cannot be stimulated to cure by UV radiation.

15. The method according to claim 1, wherein
    the liquid base layer encompasses the at least one droplet in such a manner that an orifice having a smaller area then a vertically upward projection of the at least one another droplet remains in the base layer or that the liquid base layer completely encompasses the at least one droplet.

16. The method according to claim 1, wherein
    the base layer is fixed in such a manner that, after the fixation of the base layer, the surface of the fixed base layer has no unevenness larger than maximum 20 μm by the at least one droplet remaining in the base layer.

17. The method according to claim 1, wherein
    the base layer is fixed in such a manner that an area comprising the at least one droplet has a different hardness grade, preferably of at least a factor 2, with respect to an area without applied droplets.

18. The method according to claim 1, wherein
    the at least one droplet has another gloss grade than the fixed base layer after curing or fixation in the base layer.

19. The method according to claim 1, wherein the at least one droplet congeals when contacting the workpiece and/or the base layer or imbibes a solid aggregate state, and/or wherein
    the at least one droplet is fixed in a separate step or together with the base layer.

20. The method according to claim 19, wherein that congealing of at least one droplet takes place when contacting the base layer and/or the workpiece within less than 8 seconds.

21. The method according to claim 19, wherein the at least one droplet is re-liquefied by means of a solvent after the fixation of the base layer.

22. The method according to claim 19, wherein the at least one droplet is at least partially liquefied before and/or during the at least partially removing by reheating, and is removed out of or from the base layer in this way.

23. The method according to claim 19, wherein the at least partially removing of the at least one droplet is performed by a first mechanical removal of the cured base layer, optionally followed by a mechanical brushing out of the at least one droplet and/or by a thermic heating and sucking of the then re-liquefied at least one droplet.

24. The method according to claim 10, wherein the at least one droplet is more elastic or softer compared to the fixed base layer.

25. The method according to claim 10, wherein the at least one droplet undergoes a reduction of volume during congealing or fixing.

26. The method according to claim 1, wherein the at least one droplet congeals when contacting the workpiece and/or the base layer or imbibes a solid aggregate state, and/or wherein the at least one another droplet is fixed in a separate step or together with the base layer.

27. The method according to claim 26, wherein the at least one droplet is re-liquefied by means of a solvent after the fixation of the base layer.

28. The method according to claim 26, wherein the at least partially removing of the at least one droplet is performed by a first mechanical removal of the cured base layer, optionally followed by a mechanical brushing out of the at least one droplet and/or by a thermic heating and sucking of the then re-liquefied at least one droplet.

29. The method according to claim 26, wherein that congealing of at least one droplet takes place when contacting the base layer and/or the workpiece within less than 8 seconds.

30. The method according to claim 26, wherein the at least one droplet is at least partially liquefied before and/or during the at least partially removing by reheating, and is removed out of or from the base layer in this way.

31. The method according to claim 26, wherein the at least one droplet is more elastic or softer compared to the base layer.

32. The method according to claim 26, wherein the at least one droplet undergoes a reduction of volume during congealing or fixing.

* * * * *